March 20, 1962  H. FREUDENHEIM  3,026,028
READING AND EVALUATION OF TABULAR INFORMATION
Filed Jan. 22, 1958  9 Sheets-Sheet 1

INVENTOR
Herbert Freudenheim
BY
Ralph B. Stewart
ATTORNEY

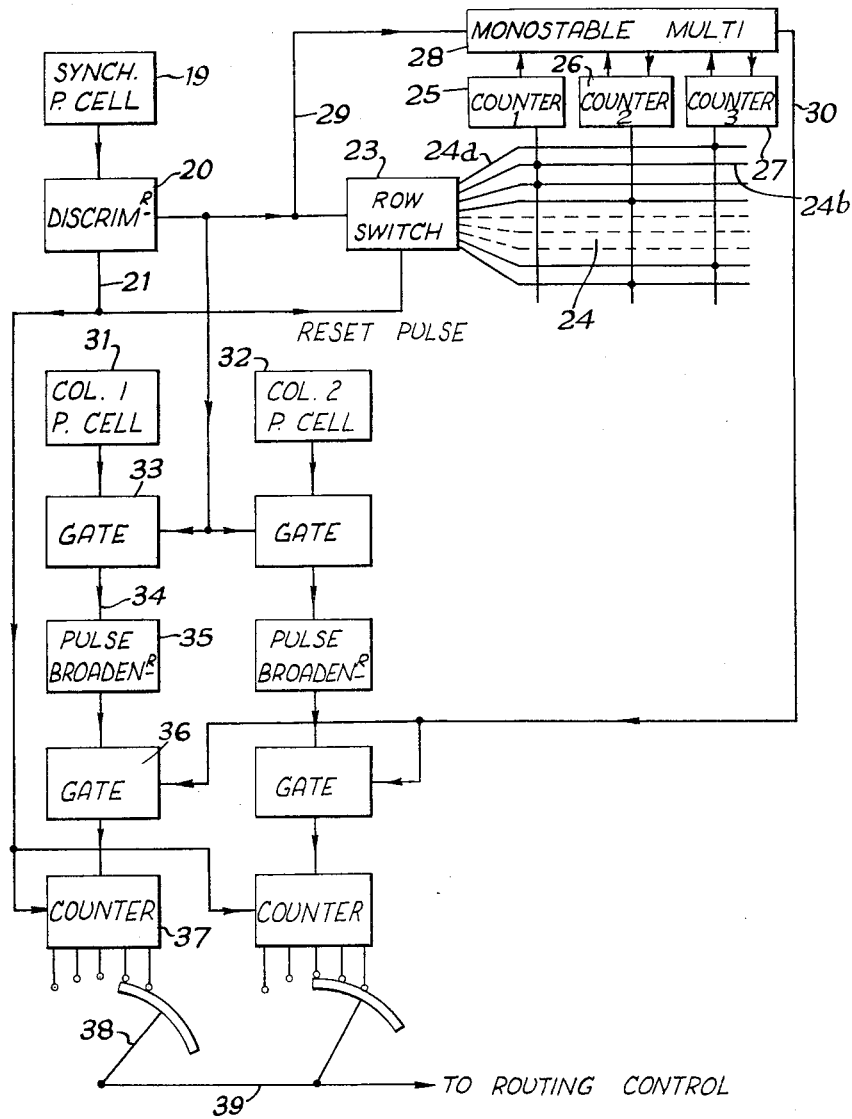

March 20, 1962     H. FREUDENHEIM     3,026,028
READING AND EVALUATION OF TABULAR INFORMATION
Filed Jan. 22, 1958     9 Sheets-Sheet 3

INVENTOR
Herbert Freudenheim
BY
Ralph B. Stewart
ATTORNEY

March 20, 1962 H. FREUDENHEIM 3,026,028
READING AND EVALUATION OF TABULAR INFORMATION
Filed Jan. 22, 1958 9 Sheets-Sheet 7

INVENTOR
Herbert Freudenheim
BY
Ralph B. Stewart
ATTORNEY

March 20, 1962   H. FREUDENHEIM   3,026,028
READING AND EVALUATION OF TABULAR INFORMATION
Filed Jan. 22, 1958   9 Sheets-Sheet 9

INVENTOR
Herbert Freudenheim
BY
Ralph B. Stewart
ATTORNEY

United States Patent Office 3,026,028
Patented Mar. 20, 1962

3,026,028
READING AND EVALUATION OF TABULAR INFORMATION
Herbert Freudenheim, 118 Harley St., London W 1, England
Filed Jan. 22, 1958, Ser. No. 710,463
Claims priority, application Great Britain Jan. 22, 1957
6 Claims. (Cl. 235—61.6)

The present invention relates to the reading and evaluation of information in tabular form and is especially concerned with the provision of efficient and reliable means for reading and evaluating rapidly certain kinds of information presented upon forms such as football coupons.

The kind of information with which the invention is concerned is that in which a mark is present only in selected ones of a column of defined areas. The individual areas are allotted any one of a number of different numerical values, say 1, 2 or 3 and the evaluation required is to determine the sum of the values of the marked areas in the column. Usually in the case of a football coupon there is a considerable number of such columns arranged side by side and the areas along any horizontal row are allotted the same value in a number of the different columns. In such a case simultaneous evaluation of all these different columns is desired since the maximum sum derived from any column determines whether a form contains a solution which has a chance of being a winning one or not.

It is to be understood that the terms "column" and "horizontal row" are used herein for convenience and are interchangeable unless the context indicates otherwise. A form may be, for instance, a piece of paper such as a football pool coupon or a piece of micro-film bearing tabular information of the type specified.

The marks may be of a variety of different shapes, for instance crosses or noughts, and may be of a wide range of densities from that of a hard pencil to that of black ink. Moreover, since, usually, the marks are made by hand, their nature is liable to vary widely.

The present invention provides means whereby the reading and evaluation of such forms can be carried out rapidly and accurately in spite of the differences in the marks referred to.

According to the present invention there is provided apparatus for reading information of the kind specified and for evaluating such information which comprises means for producing continuous relative movement between a form bearing the information and a photo-sensitive device in such a manner that light from a source reflected or transmitted by the form is directed upon the said device from each of the areas in a column in succession, the said device being adapted to generate a control pulse when an area viewed by the said device contains a mark owing to the alteration in light reflection or transmission produced by the mark, a pulse generating unit adapted to generate a plurality of groups of pulses, each group containing a different number of pulses, gating means adapted to gate a selected group of pulses into a pulse counter when, and only when, one of the said control pulses is generated, and pulse group selecting means adapted for manual pre-setting and responsive to the position in the column of the area operative from time to time upon the said device, whereby the said selected group of pulses is determined for each area.

According to another aspect of the invention there is provided apparatus for reading and evaluating information of the kind specified simultaneously in a plurality of parallel columns of areas, successive areas in the columns respectively constituting rows of areas, comprising means for producing continuous relative movement between a form bearing the information and a plurality of photo-sensitive devices in such a manner that light from a source reflected or transmitted by the form is directed upon the said devices from the columns respectively, for each column the light being directed upon the respective device from each of the areas of the column in succession, each said device being adapted to generate a control pulse when the area viewed by the device contains a mark owing to the alteration in light reflection or transmission produced by the mark, a pulse generating unit adapted to generate a plurality of groups of pulses, each group containing a different number of pulses, a plurality of gating means coupled to the said devices respectively each gating means being adapted to gate a selected group of pulses into an individual pulse counter coupled to that gating means when, and only when, one of the said control pulses is generated by the control device coupled to that gating means, and selecting means adapted for manual pre-setting and responsive to the position of the row of areas operative from time to time upon the said devices, whereby the said selected group of pulses is determined for each row.

In the case of football pool coupons and usually in the case of any form printed on paper or other non-transparent material it is preferable for the photo-sensitive device or devices to receive light by reflection.

The invention will now be described, by way of example, with reference to the accompanying drawings, in which:

FIG. 2 is a block circuit diagram of a part of one embodiment of the invention,

Figure 1:
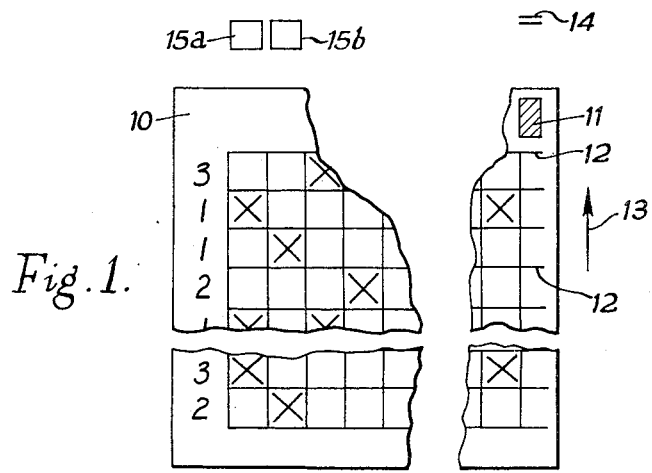
FIG. 1 is a diagram illustrating features of the invention.
Figure 3:
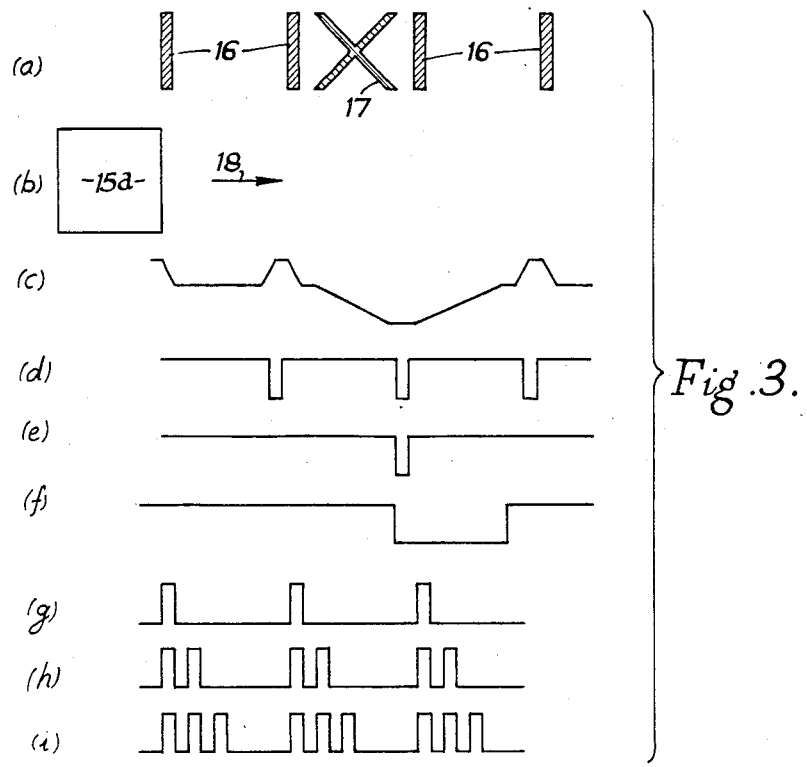
Figure 4:
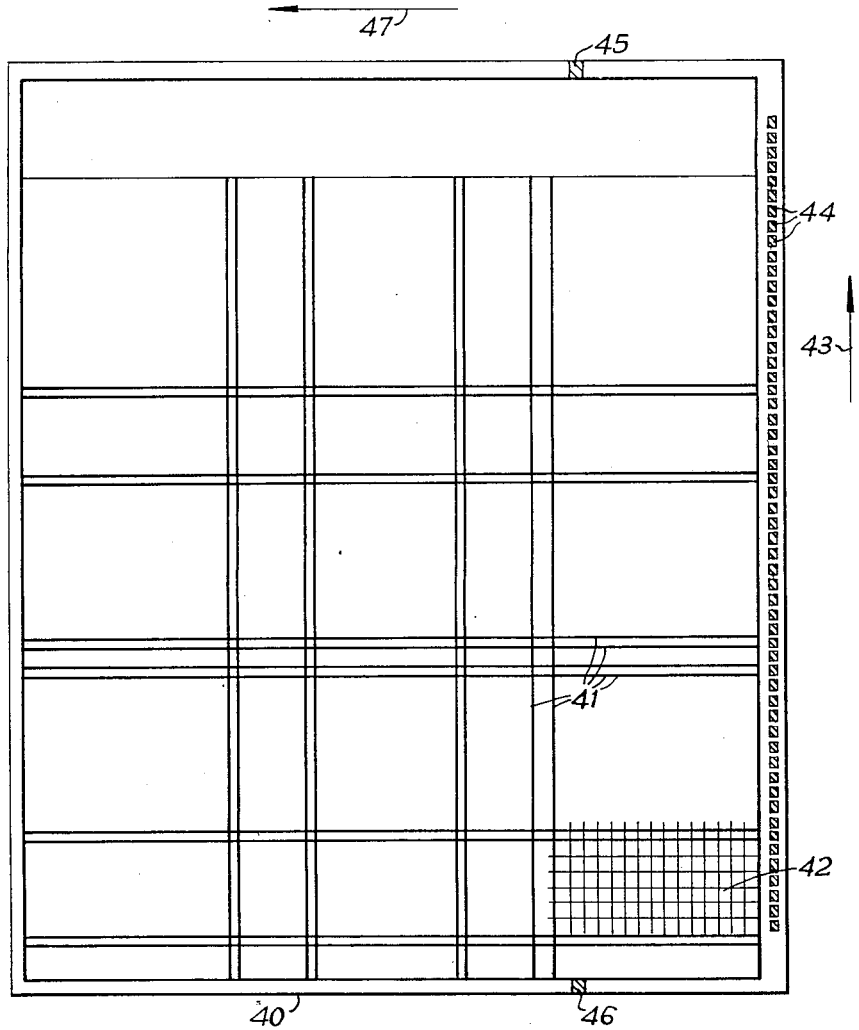
Figure 5:
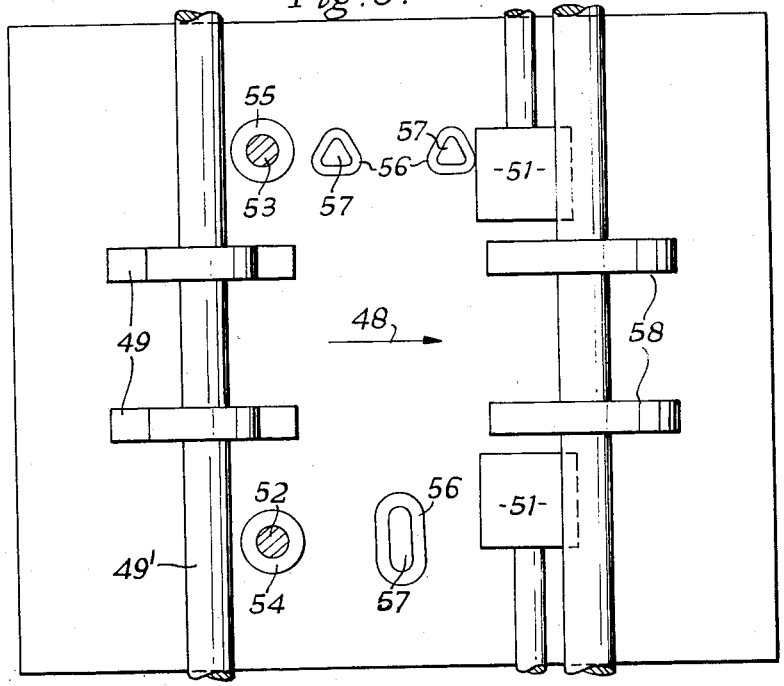
Figure 6:
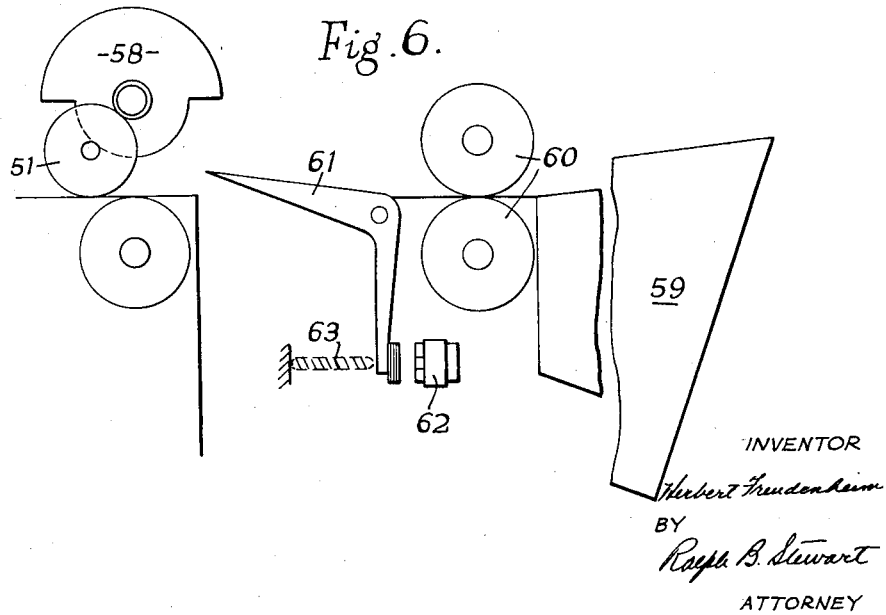
Figure 7:
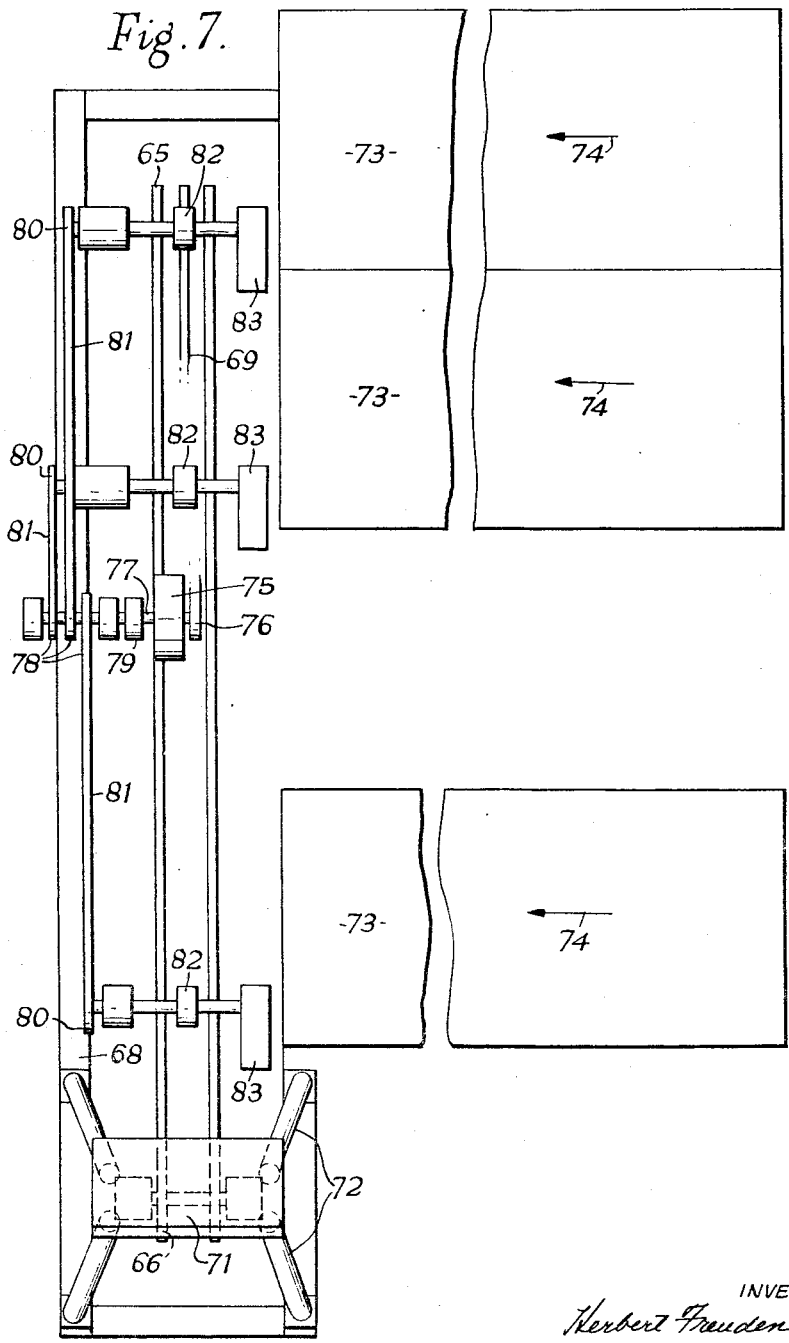
Figure 8:
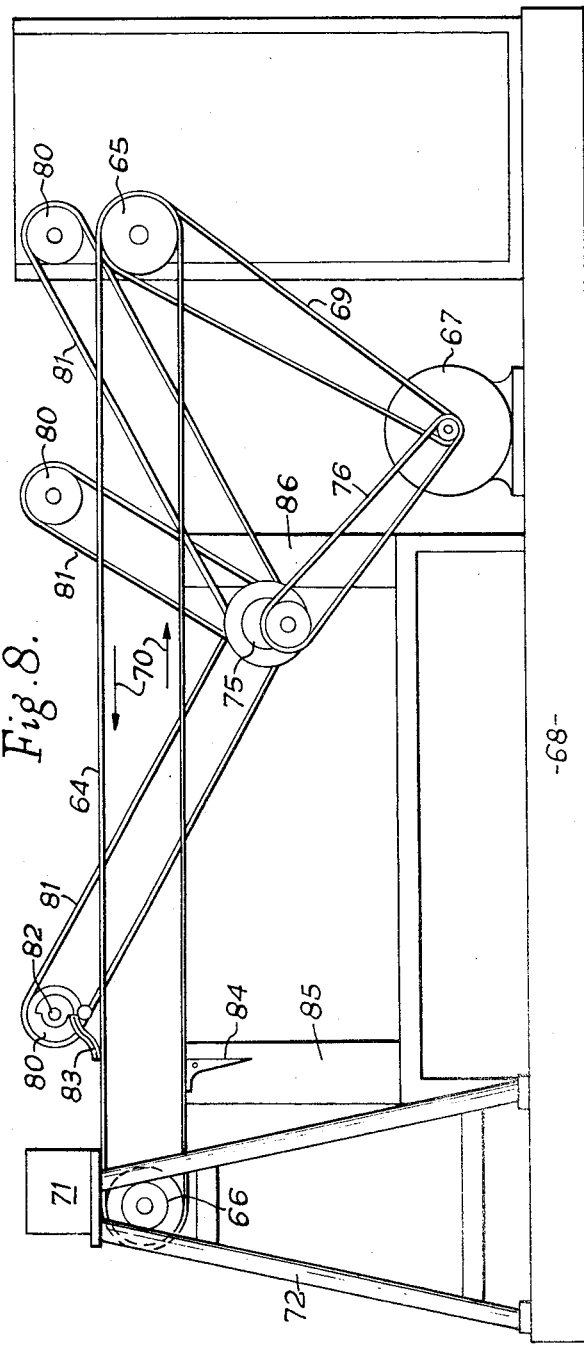
Figure 9:
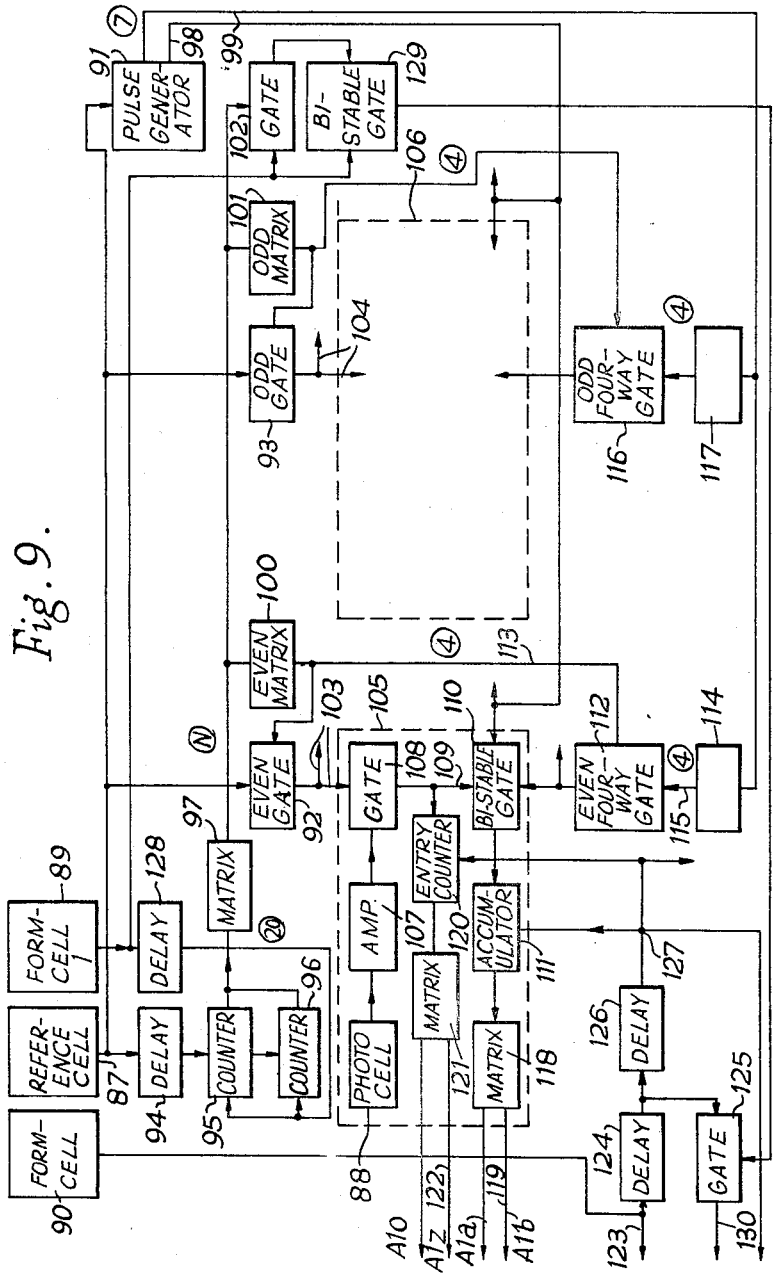
Figure 10:
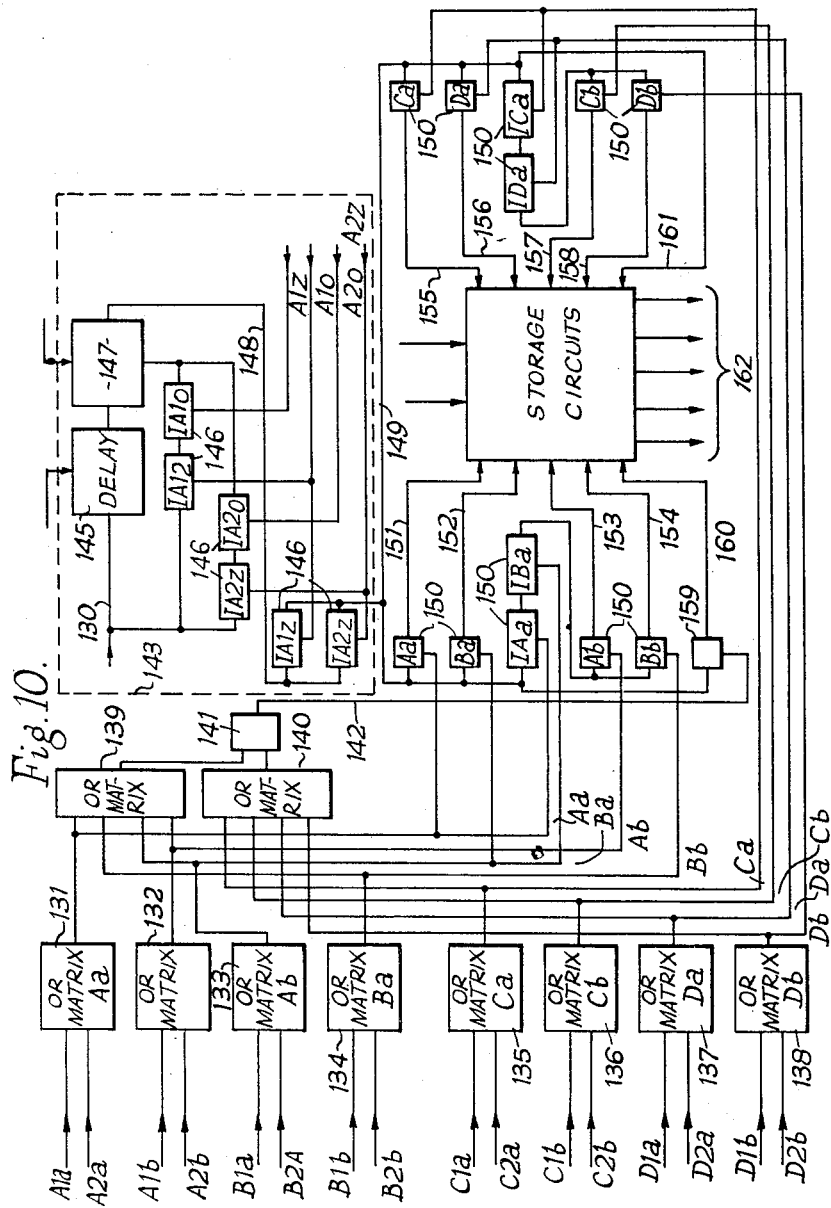

FIG. 3 is an explanatory diagram with idealised waveforms associated with the operation of the embodiment of FIG. 1, FIG. 4 is a representation of a form for football pools, FIG. 5 is a diagrammatic plan view of apparatus for punching registering holes in the forms shown in FIG. 4, FIG. 6 is a diagrammatic elevation of the apparatus shown in FIG. 5, FIGS. 7 and 8 are a diagrammatic plan and elevation respectively of a second embodiment of the invention showing its mechanical arrangement, and, FIGS. 9 and 10 are block circuit diagrams of the electrical circuits of the second embodiment of the invention.

In these figures, when electrical connection between units of the circuit is through more than one lead, the number of leads represented by the line drawn connecting the units is given in a circle against the line. The number "N" is the number of black areas 44 hereinafter described with reference to FIG. 4 (in the case shown being 55).

Figure 11:
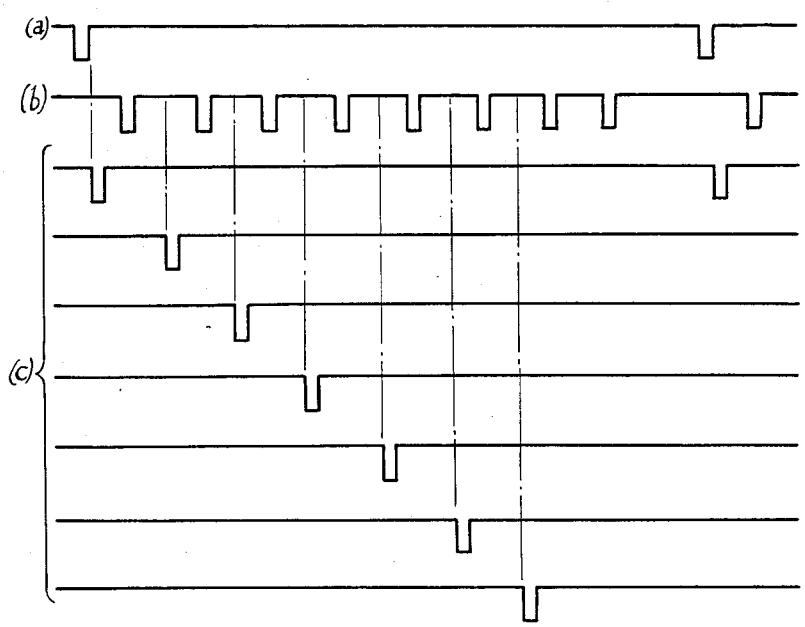

FIG. 11 is an explanatory diagram showing pulse wave forms.

The first embodiment of the invention is an idealised embodiment which illustrates the principles of the invention. The second embodiment is more complex and suitable for use with actual football pool coupons.

Referring to FIG. 1, there is shown at 10 a form such as may be read and evaluated by means of the invention. It is ruled to divide the central area of the form into squares. Each vertical column contains say 52 squares of which a maximum of say five contain a mark, in this example a cross. Each horizontal row of squares is concerned with a different event, in this example the result of a football match, and according to whether the result is a home win, an away win, or a draw, the row is allotted the numerical value 1, 2 or 3 respectively. An assumed value for each row is shown on the left of each row. This means that if a cross is placed in a square in a row of the value say 3, this cross scores 3.

It is required to add the values of the crosses in each vertical column individually and simultaneously.

The winning form is that having the largest total score in any column. It is usual to decide upon some target number and to sort the forms into those having no column totalling as much as this number and forms having at least one column totalling the target number or more. Only the latter forms have to be further examined to determine the winner and they will, of course, be in general only a small fraction of the total number of forms sorted.

In the example being described the form is provided with a re-setting mark 11 of relatively large size and synchronising marks or bars 12 which are extensions of the horizontal rulings of the form. The form is illuminated by any suitable means and is moved at a uniform speed in the direction of the arrow 13. Light reflected from the surface of the form passes through a narrow, stationary slit 14, arranged on the line of motion of the area 11 and the bars 12, on to a photo-cell which is not shown. As the form moves there will, therefore, be generated in this photo-cell first a broad re-setting pulse produced by the mark 11 and then a series of narrow synchronising pulses produced by the bars 12.

Separate photo-cells (not shown) are arranged to receive light reflected from the columns respectively of squares on the form through square apertures slightly smaller than the area of a square. Two of these apertures, associated with the two left-most columns, are shown as 15a and 15b. When the sensitive area of the photo-cells is different from that of the apertures 15a and 15b, a suitable optical system is provided between the apertures and the cells. This optical system may include a cylindrical lens where required. For instance in one example the aperture side measures 3 mm. whereas the photo-sensitive area of the cell is 1 x 0.1 mm. A suitable optical system including a cylindrical lens can reduce the 3 x 3 mm. area to a 1 x 0.1 mm. area. It is of course to be understood that a physical aperature such as 15a and 15b need not be used.

The effect of scanning the squares of one column over a photo-cell will be described with reference to FIG. 3. At (a) is shown an enlarged view of the markings scanned, 16 representing the horizontal rulings separating squares and 17 representing a cross in one square. The scanning aperture 15a is shown at (b) and the motion of the form is such that the aperture may be assumed to move over the pattern (a) in the direction of the arrow 18. The waveform generated in the photo-cell is as shown at (c), the abscissa repersenting the position of the leading edge of the aperture 15a relative to the markings (a). It is noted that the cross 17 produces a negative-going excusion having a maximum occurring just before the leading edge of the scanning aperture reaches the ruling 16 beyond the cross.

The relative locations of the apertures 14 and 15a in FIG. 1 is made such that the synchronising pulses generated by the bars 12, shown at (d) in FIG. 3, occur at about the negative maximum of the waveform (c). Even when the marking is not quite central and when it has a shape other than a cross, for instance O, the waveform will not depart greatly from that at (c). As will be explained, the waveform (c) is employed to gate the synchronising pulses (d) in such a manner that a pulse is passed only when a waveform (c) is sufficiently negative and there is thus obtained the control pulse (e).

Referring now to FIG. 2, the synchronising photo-cell, which scans the marks 11 and 12 of FIG. 1, is shown at 19. A discriminator 20 selects the broad pulses from the marks 11 and delivers them to an output 21. This discrimination may be effected in any convenient way, for instance by integration followed by amplitude limiting, and the resulting pulses are used as will be described later as re-setting pulses. The synchronising pulses from an output 22 of the discriminator 20 are applied to a row counter switch 23 which may be an electronic switch and serves to connect the input to a series of outputs 24 in succession. Thus the first pulses passes to the output 24a, the second pulse to the output 24b and so on.

The outputs 24 are connected to a manually-presettable connection board whereby each can be connected to any one of three counters 25, 26 or 27, for instance by the use of suitable plugs. These counters are coupled to a monostable multivibrator 28, to which the synchronising pulses are applied directly at 29. The constitution of the counters and their connection to the multivibrator 28 are such that when a pulse is applied at 29 the multivibrator 28 generates a short pulse at its output 30. If at that time the synchronizing pulse is simultaneously applied through the row switch 23 to the counter 25, any further pulse generation by the multivibrator 28 in response to the synchronising pulse being considered is prevented. If at the time in question the pulse is applied by the row switch 23 to the counter 26, this counter delivers a pulse after a short delay to the multivibrator 28 which then generates a second short pulse. If the row switch applies a pulse to the counter 27, the multivibrator 28 is caused to deliver a total of three pulses to its output 30 in response to one synchronising pulse at 29.

The photo-cells associated with two columns of the form are indicated at 31 and 32. It will, of course, be understood that in general a number equal to the total number of columns will be used. Since the circuits associated with all these photo-cells are alike, only one will be described in detail. The photo-cell 31 is connected to a gate 33 to which are applied synchronising pulses from 22. Consequently, as already described, the control pulse of FIG. 3(e) will appear at the output 34 of the gate. This output is applied to a pulse broadener 35 which generates the control pulse of FIG. 3(f) which is applied to a further gate 36 to open this gate for the duration of its negative-going portions. The gate 36 therefore controls the passage of pulses from the multivibrator 28. Thus whenever a negative pulse occurs in the waveform of FIG. 3(f) there is passed through the gating device 36 a group of one, two or three pulses, as shown at (g), (h) and (i) in FIG. 3, according to which of the counters 25, 26 or 27 is, at the time in question, made operative by the row switch 23.

Thus considering the left hand column in FIG. 1, when the uppermost square is scanned the pulses from 22 in FIG. 2 are applied to the counter 27 and groups of three pulses are generated at 30. However there is no mark in this square and the gate 36 is therefore closed and yields no output. When the second square is scanned the counter 25 is operative and one pulse is generated at 30. The gate 36 is opened by the mark in this square and the gate 36 therefore passes one pulse. During the scanning of the third and fourth squares groups of one and two pulses respectively are generated at 30. No pulses are however passed by the gate 36 because there are no marks in these squares. The scanning of the fifth square causes one pulse to be passed by the gate 36.

The pulses passed by the gate 36 are applied to a counter 37 which has a pre-settable output 38 which is set to a target count. Thus if the number of pulses counted in 37 equals or exceeds the target count a signal is delivered to an output 39. A separate accumulator means 37 is provided for each column and these are connected together. If a signal appears in any of the outputs 38, this passes to a routing control which automatically routes the form to an "accept" bin. In the absence of such a signal the form passes to a "reject" bin. Mechanisms suitable for routing forms in this way are well known. The settings of the outputs 37 for different columns may differ from one another.

The reset pulses from 21 are applied to reset the counters 37 and the row switch 23 before scanning of a form begins.

It is found desirable to illuminate the forms by light falling on them at an angle of about 45° and to arrange the photo-cells to receive reflected light in a direction normal to the surface of the forms. The light may be directed from one or both sides of the photo-cells.

Since the forms are usually thin and have usually been folded, it is desirable to provide means for flattening the forms. They may be delivered to the scanning region stretched between two pairs of rollers, the speeds of the rollers being chosen to effect the necessary stretching.

The forms may pass in the scanning region beneath a glass roller which serves to flatten the form and also to provide a cylindrical lens.

In another arrangement the forms are pressed flat by means of an endless belt of transparent material through which they are viewed by the photo-cells. In yet another arrangement the forms are led face downwards over the outer surface of a rotating, hollow glass roller having the light source, photo-cells and other optical devices fixed within it.

Turning now to the next embodiment, the form shown in FIG. 4 is a sheet of paper 40 divided by thick black lines 41 into a number of areas for different pools such as the "treble chance," "three draws" and the "four aways" pools, which are common in Great Britain at the present time. Some of these areas have matches printed in them and others, such as that shown at 42 are divided by narrow lines into small squares in which crosses are placed to forecast the results of the matches. The form is moved in the sorting machine in the direction of the arrow 43.

A row of accurately located black synchronising areas 44 is printed down the right-hand margin of the form and these areas are scanned by a photo-cell in a manner to be described later for synchronising the electrical circuits of the sorting machine with the longitudinal position of the form as it moves through the machine. Two accurately located black squares 45 and 46 are printed in the upper and lower margins of the form respectively.

Before being fed to the sorting machine three registering holes are punched in the forms by apparatus shown in FIGS. 5 and 6. The forms are passed transversely (that is in the direction of the arrow 47 in FIG. 4) through the apparatus in the direction of the arrow 48. The forms are fed singly to the machine by any suitable feeder and are picked up one-by-one by a pair of segmented feed wheels 49 on a spindle 49'. The wheels 49 move each form rapidly to a position at which its leading edges are picked up by two slowly rotating light friction drive wheels 51. The wheels 51 move the forms slowly forward until the areas 45 and 46 are sensed by two photocells 52 and 53 respectively. As seen as the cell 52 senses the area 45 a clamp 54 is brought down by an electromagnet (not shown) to hold the form at that point. As soon as the cell 53 senses the area 46 a clamp 55 is likewise brought down to hold the paper at the second point. The friction drive through the wheels 51 is made insufficient to tear the form when it is clamped. The clamps 54 and 55 are operated independently so that if the form is initially skewed the skew is corrected and the form is brought into an accurate transverse location.

When both clamps have operated, three further clamps 56 are brought down by further electromagnets (not shown) and three punches 57 within the clamps 56 operate to punch registration holes in the paper. All clamps and punches then lift and two segmented wheels 58 operate to pass the form rapidly to a stacking device 59, through two drive rollers 60, shown in FIG. 6.

A flap 61 is interposed in the path between the wheels 58 and the rollers 60. This flap is normally held down by an electromagnet 62 and forms then pass over it to the rollers 60. The electromagnet 62 operates against a spring 63 and when the electromagnet is released the spring 63 raises the flap to the position shown in the drawing and any form fed on by the wheel 58 passes under the flap into a reject bin. It is arranged that the electro-magnet 62 is released whenever some malfunctioning of the punches occurs and incorrectly punched forms are thus not fed to the stacking device 59.

Turning now to FIGS. 7 and 8 the feeding and sorting machine comprises an endless belt 64 which runs over two pulleys 65 and 66. An electric motor 67 is mounted on a base frame 68 and drives the pulley 65 through a belt 69. The belt 64 is thus driven round at constant speed in the direction of the arrows 70. A scanning device 71 housing a number of photo-cells is mounted on a framework 72 and is positioned over the belt 64 where it passes over the pulley 66.

Three conveyer belts 73 are arranged along one side of the belt 64 and are driven in the direction of the arrows 74. Each belt 73 is fed with single forms by a feeder (not shown) and feeds forms to the belt 64 from the side. The feeders and the belts 73 are synchronised with the belt 64 in such a way that by the time the belt 64 passes under the scanning device 71 it has forms on it spaced apart by approximately the length of a form.

The motor 67 is also coupled to a gear-box 75 through a belt 76. The gear-box 75 has a drive spindle 77 coupled to three pulleys 78 through a coupling 79. The pulleys 78 are coupled to three pulleys 80 through belts 81. The pulleys 80 drive three segment wheels 82 which pick up the forms fed across the belt 64 by the belts 73 and accelerate them to the speed of the belt 64. The forms are guided through guides 83 onto the belt 64 which is provided with sets of three pins (not shown) which engage with the registration holes punched in the forms. On account of the procedure adopted in punching these holes the forms are accurately positioned transversely on the belt and the columns of squares on the form pass accurately under the photo-cells in the scanning device 71. The forms are held against the belt 64 by guide rails (not shown).

Underneath the belt 64 are arranged sixteen flaps of which one flap 84 is shown. These flaps operate in the same way as the flap 61 (FIG. 6) under the control of the scanning device 71. When a flap is raised a form approaching it is diverted into a bin 85 underneath the belt 64. If no flap is raised the form passes on to a final bin 86. The guide rails mentioned above are either broken at the flaps 84 or arranged to move away in portions whenever a flap is operated so that forms may leave the belt 64.

The photo-cells and lighting arrangements in the scanning device 71 are not shown. They comprise two strip lights with cylindrical lenses beside and above the belt 64 and arranged to illuminate the forms overall. One reference or synchronizing photo-cell (shown with its associated pulse generating circuit as the block 87 in FIG. 9) is arranged over the line of the black areas 44 on the form and a plurality of photo-cells (one of which is shown as the block 88 in FIG. 9) are arranged over the lines of columns of squares respectively, the photo-cells in odd lines being staggered with respect to those in even lines by the width of two rows, in order that all the cells may be accommodated more readily. All these cells pick up light reflected from the form.

Two more photo-cells, referred to as form-cells 1 and 2 and shown, with their associated pulse generating circuits, as blocks 89 and 90 in FIG. 9, are arranged with associated lamps in such a way that the passage of a form under the scanning device interrupts the light falling on the cells. These form-cells control various steps in the sorting machine as hereinafter described.

Turning now to FIG. 9, the output of the reference photo-cell and its associated pulse generating circuit is connected to a pulse generator 91, an "even gate" 92 and "odd gate" 93, and, through a delay device 94, to a decade counter comprising two multi-gap cold cathode gas discharge valves 95 and 96 connected in cascade. The pulse generating circuit associated with the reference photo-cell provides a synchronizing or reference pulse for each black area 44 FIG. 4. The valves 95 and 96 count the rows of the form passing under the scanning device and their output leads are connected to a matrix of diodes 97 which has N output leads, the signals in which control the row-by-row operations of the machine.

The pulse generator 91 is triggered by each reference pulse to provide in a lead 98 a train of eight multiple reference pulses shown at (b) in FIG. 11. The reference pulses are shown at (a). The pulse generator comprises a monostable trigger circuit which is triggered by the reference pulses and which allows a multivibrator to run in its unstable state which is of duration such as to allow eight oscillations of the multivibrator. The pulse generator also comprises count-down circuits and trigger circuits coupled to the count down circuits and providing in seven leads 99 seven control pulses shown at (c) and occurring a little before the first seven of the multiple reference pulses respectively. The output leads of the matrix 97 are connected to an "even matrix" 100, an "odd matrix" 101 and a checking gate 102. The matrices 100 and 101 are diode matrices associated with the even and odd columns of the form respectively. The even matrix 100 has one output lead connected to the even gate 92 and allows a reference pulse to pass through the even gate 92 to a lead 103 each time the photo-cells scanning even columns pass over a row of squares in which entries may be made. The odd matrix 101 is similarly connected to the odd gate 93 which has an output lead 104. The connections in the manually presettable matrices 100 and 101 are different in order to take account of the staggering of the photo-cells. As already mentioned, the matrices are conventional diode matrices and the diodes are conveniently plug in diodes which can be plugged in at selected matrix intersections in order to provide pulses to gates 112 and 116 in a manner to be described below.

Of the circuits individual to the different columns of the form only one is shown in detail. This circuit is within the enclosure 105 and comprises the photo-cell 88 which is associated with an even column. One circuit associated with an odd column is represented symbolically the enclosure 106. The circuits associated with all columns are identical and only that within the enclosure 105 will be described in detail.

The output of the photo-cell 88 is connected through an amplifier 107 to a gate 108. The lead 103 is also connected to the gate 108 which provides output pulses in a lead 109 when the photo-cell 88 scans a square with a marking in it. The photo-cell 88, the amplifier 107 and the gate 108 operate as a control pulse-generating photo-sensitive device in the manner described for the first embodiment of the invention with reference to FIG. 3(a), (b), (c), (d) and (e).

The lead 109 is connected as one triggering input to a bi-stable gate 110 which is normally in a first state but is triggered to a second state by a pulse in the lead 109. The lead 98 from the pulse generator 91 is connected to the gate 110 and when the gate 110 is in its second state multiple reference pulses from the pulse generator 91 pass through the gate and are added in to an accumulator 111.

An "even four-way selecting gate" 112 has its output connected as another triggering input to the gate 110 and when operated triggers the gate 110 back to its first state. Thus by arranging that the gate 112 is operated at the correct instant the number of pulses appropriate to a mark in a square in any row can be added into the accumulator 111. Selected control pulses in the leads 99 are used to operate the gate in conjunction with pulses in four further leads 113 from the even matrix 100. The seven leads are connected to a manually-presettable terminal block 114 from which four terminals are connected to four input leads 115 of the gate 112. The four leads 113 are connected to four triggering inputs of the gate 112 and pulses in the four leads 113 allow pulses in the four leads 115 respectively to pass to the gate 110 to reset it to its first state. The connections in the terminal block 114 are made appropriate to the pool being checked. Thus if the treble chance pool is being checked it is required to be able to add one pulse into the accumulator 110 for a home win, two for an away win, three for a draw and two for a void. It is then arranged that the second, third, fourth and fifth control pulses (FIG. 11(c)) are fed to the four wires 115 respectively. The second control pulse resets the bi-stable gate 110 to its first state after the first multiple reference pulse has passed through it into the accumulator 111, and so on. The connections within the matrix 100 are made appropriate to the results of the matches so that the pulses appropriate to each row of the form are allowed to pass through the gate 112. Thus the four leads from the matrix to the gate 112 correspond to a home win, an away win, a draw and a void respectively and pulses are arranged to appear in these leads in accordance with the known results for each row on the form. If for example the row being scanned has a draw for its result, the pulse from matrix 100 is in that lead 113 which corresponds to a draw. This opens gate 112 to allow a pulse to pass from that lead 115 which carries the fourth control pulse and, in the case of a draw, the bistable gate 110 is therefore reset by the fourth control pulse.

Similarly an "odd four-way gate" 116 and a terminal block 117 are provided for the odd columns. If more than one pool is arranged side by side different pairs of odd and even four-way gates may be provided for the columns pertaining to the different pools.

The output of the accumulator 111 is fed to a diode matrix 118 which has a plurality of output leads, of which two 119 only are shown for simplicity. In the following description a symbolism will be used to indicate different categories of information. In this symbolism capital letters A, B, C, D are used to represent four groups of columns belonging to four pools, namely the treble chance eight results and seven results pools, the three draws pool and the four aways pool. Numbers are used to indicate columns within the groups A, B, C, and D, and small letters $a$, $b$, etc. are used to indicate the "merit" of the entries in a column. Thus if the entries in a column give the maximum possible total for that column the column has merit $a$, if they give a total one short of the maximum the column has merit $b$, and so on. Signals are provided in the different leads when the different merits $a$, $b$, etc. are achieved in the accumulator 111. The two wires 119 shown are labelled A1$a$ and A1$b$, it being assumed that the circuit in the enclosure 105 pertains to the first column of pool A.

The lead 109 from the gate 108 is also connected to an entry counter 120 which is connected to a matrix 121. The matrix 121 has two output leads 122 in which signals are provided when the counter 120 has counted no marks in a column and the correct number of marks in a column respectively. These signals are labelled A1$o$ and A1$z$ respectively. The correct number of marks is the number of entries which the client is required to make in each column and may be 7 or 8 for example. The counter 120 can itself readily be arranged to develop the signal A1$z$ when the count of this number is reached. The signals A1$o$ and A1$z$ are used to insure that only forms with at least one column with the correct number of entries and with no columns with an incorrect number of entries are sorted by the machine, forms which fail to pass this check being segregated for inspection. This function is performed by a checking circuit 143 subsequently described.

The form photo-cell 89 is arranged a little in front of the reference photo-cell 87 and the photo-cells scanning the columns and the form photo-cell 90 is arranged a little in front of the cell 89. Thus as a form passes under the scanning device 71 the following sequence of events occurs:

Form photo-cell 90 is cut-off
Form photo-cell 89 is cut-off
The columns of squares and the areas 44 are scanned
Form photo-cell 90 is re-illuminated
Form photo-cell 89 is re-illuminated The form photo-cell 90 has its output connected to a lead 123 which is connected to clear storage circuits 144 in the coding part of the machine which is that part of the machine shown in FIG. 10. The lead 123 is also connected through a delay circuit 124 firstly to a gate 125 and secondly through a further delay circuit 126 to a lead 127. The lead 127 is connected to the accumulator 111, the counter 120 and to the storage circuits 144.

A signal in the lead 127 clears the accumulator 111, the counter 120 and allows the flaps 84 to operate in response to the state of the storage circuits 144.

The form photo-cell 89 is connected through a delay device 128 which only delays the positive-going edge of the wave form generated when the cell 89 is re-illuminated to the valves 95 and 96 and directly to the gate 102 and to a bi-stable gate 129 which is also connected to the gate 102. The output of the bi-stable gate 129 is connected to the gate 125 which has an output lead 130 connected to checking circuits to be described.

The sorting machine performs the following sequence of operations under the control of the form photo-cells 89 and 90.

I. Cell 90 is cut-off:
A signal in the lead 123 clears the storage circuits 144. After a short delay a signal is provided in the lead 130 and the coding part of the machine is allowed to be loaded with information from the accumulators which pertains to the previous form, providing loading is not inhibited by the checking circuits to be described or by the gate 125. The gate 125 is only opened by the bi-stable gate 129 if the correct number of areas 44 have been counted by the valves 95 and 96.

After a further short delay a signal is provided in the lead 127 and the entry counters and accumulators are cleared and the flaps 89 are allowed to operate in response to the state of the storage circuits 144.

II. Cell 89 is cut-off:
The valves 95 and 96 are released to count the areas 44.

III. The form is scanned:
Information is fed into the valves 95 and 96, the accumulators and entry counters.

IV. Cell 90 is re-illuminated:
(No specific action).

V. Cell 89 is re-illuminated:
The bi-stable gate 129 is set to the state in which it opens the gate 125 if the correct number of areas 44 have been counted by the valves 95 and 96.

After a short delay the valves 95 and 96 are pulled back to zero and held there until the sequence is repeated.

Turning now to FIG. 10 there is described a simplified coding circuit catering for two columns in each pool A, B, C, D and two merits, $a$ and $b$. It will be apparent how further matrices and gates are added to cater for further possibilities.

The leads A1$a$ and so on from the matrices such as 118 in FIG. 9 are connected as shown to 8 "or matrices" 131 to 138 which provide output signals in response to an input signal in either lead connected to them. Thus the matrix 131 provides an output signal whenever there is a column in a form of merit $a$ in the pool A. The symbols in the other matrices indicate the information represented by output signals from the matrices.

The outputs of the matrices 131 to 134 are connected to an "or matrix" 139 and the outputs of the matrices 135 to 138 are connected to an "or matrix" 140. The outputs of the matrices 139 and 140 are connected to an "and matrix" 141 which provides an output signal in a lead 142 whenever a form has merit $a$ or $b$ in any column in pool A or pool B and in any column of pool C or pool D. Such forms will be said to have "compound merit." The portion of the circuit within the enclosure 143 constitutes the checking part of the circuit hereinbefore referred to. The circuit comprises a delay device 145, a monostable gate 147 which is normally transmissive and a plurality of gates 146 which are normally transmissive but inhibited on the presence of the signal indicated by the symbol following an I (for "inhibit") in the boxes representing the gates. This portion of the circuit has been further simplified by showing only gates 146 for the signals A1$a$, A1$z$, A2$o$ and A2$z$.

The lead 130 is connected through the delay device 145 and the gate 147 to a lead 148. The lead 130 is also connected to the trigger terminal of the gate 147 through the series-parallel combination of gates shown. The delay time of the device 145 and the re-set time of the gate 147 are made such that no signal passes through to the lead 148 if a signal reaches the trigger terminal of the gate 147. It will be appreciated from the drawing that, if no signal is to reach the trigger terminal, every column of the form must have either no entries in it or the correct number of entries, that is either A1$z$ or A1$o$ must be present, A2$z$ or A2$o$ must be present and so on.

The lead 148 is connected through more gates 146 to a lead 149 as shown and it will again be appreciated from the drawing that a signal can not pass to the lead 149 if all columns in the form are blank. Hence a signal only reaches the lead 149 for a form having at least one column with the correct number of entries, no columns with an incorrect number of entries and (by virtue of the gate 125 in FIG. 9), for which the correct number of areas 44 have been counted. If no signal reaches the lead 149 no flap is operated and the form passes to the bin 86 (FIG. 8) and is scrutinised. This procedure provides a large degree of protection against faulty operation of the electrical circuits of the machine.

The lead 149 is connected through a plurality of gates 150 as shown in the drawing to eight leads 151 to 158, through a gate 159 to a lead 160 and directly to a lead 161. The leads 151 to 158, 160 and 161 are connected to the storage circuits 144 which has a plurality of output leads 162 (only five are shown), which are connected to operate the flaps of the sorting machine.

A gate 150 is opened or closed when the signal represented by symbol in the box representing the gate is present when the symbol is not or is preceded by an I respectively.

The gate 159 is opened when a signal is present in the lead 142. Accordingly it will be appreciated from the drawing that signals in the leads 151 to 158, 160 and 161 carry the following significances:

160—The form has compound merit
151—The form has merit $a$ in pool A
152—The form has merit $a$ in pool B
153—The form has merit $b$ in pool A
154—The form has merit $b$ in pool B
155—The form has merit $a$ in pool C
156—The form has merit $a$ in pool D
157—The form has merit $b$ in pool C
158—The form has merit $b$ in pool D
161—The form has no merit higher than $c$.

The storage circuits 144 comprise a plurality of bi-stable trigger circuits which are set to store the signals in the leads 151 to 158, 160 and 161. On receipt of a signal in the lead 127 the flaps are operated in response to the states of the bi-stable trigger circuits.

The flap operated in response to a signal in the lead 160 is placed first in the row of flaps, so that when a form has compound merit, although several flaps will be operated, the form will be diverted to the bin for forms with compound merit.

Instead of punching accurately located registration holes in the forms before feeding them to the sorting machine there may be used suitable markings on the forms co-operating with photo-cells to generate correcting voltages which are applied through serves to apply necessary corrections. It is again only necessary to correct the lateral position and the orientation. In order to correct the relative location of the forms and photo-cells, it is not necessary to move either. Instead, an optical system between the forms and the photo-cells may be moved.

I claim:

1. Apparatus for reading and evaluating information carried by a form whereon marks are present only in selected ones of a column of defined areas, which areas are individually allotted numerical values, the form furthermore bearing a column of synchronizing marks, said apparatus comprising means for supporting said form, a first photo-sensitive device and a synchronizing photo-sitive device, means for directing light to said devices from said form, means for relatively moving said form and said devices, whereby said first device scans said areas in turn to generate a control pulse for each area wherein a mark is present, and said synchronizing photo-sensitive device scans said synchronizing marks in turn to generate synchronizing pulses, pulse-counting means, means coupling said synchronizing photo-sensitive device to said counting means whereby said counting means counts said synchronizing pulses to set up an indication of the area currently being scanned, pulse-generating means for generating groups of pulses of numbers equal to the said numerical values, a gating device, selecting means including manually-presettable means, for selectively applying groups of pulses of different number generated by said pulse-generating means to said gating device, means coupling said counting means to said selecting means whereby as successive ones of said areas are scanned said selecting means apply in succession to said gating device groups of pulses corresponding in number to the numerical values allotted to said areas respectively as determined by the setting of said manually-presettable means, means coupling the first said photo-sensitive device to said gating device to open said gating device only on the occurrence of a control pulse and accumulator means coupled to said gating device to count the pulses passed by said gating device.

2. Apparatus for reading and evaluating information carried by a form whereon marks are present only in selected ones of an array of areas lying in rows and columns, which rows of areas are individually allotted numerical values, the form furthermore bearing a column of synchronizing marks, said apparatus comprising means for supporting said form, a plurality of photosensitive devices corresponding to said columns of areas respectively and a synchronizing photo-sensitive device, means for directing light to said devices from said form, means for relatively moving said form and said devices, whereby said plurality of devices scan the areas of said respective columns of areas in turn, to individually generate a control pulse for each scanned area wherein a mark is present and said synchronising photo-sensitive device scans said synchronizing marks to generate synchronizing pulses, pulse-counting means, means coupling said synchronizing photo-sensitive means to said counting means whereby said counting means counts said synchronizing pulses to set up an indication of the row of areas currently being scanned, pulse-generating means for generating groups of pulses of numbers equal to said numerical values, a plurality of gating devices corresponding to said columns of areas respectively, selecting means, including manually-presettable means, for selectively applying groups of pulses of different number generated by said pulse-generating means to said gating devices in common, means coupling said counting means to said selecting means whereby as successive rows of said areas are scanned said selecting means apply in succession to said gating device groups of pulses corresponding in number to the numerical values allotted to said rows respectively as determined by the setting of said manually-presettable means, means coupling the plurality of photo-sensitive devices to the gating devices respectively to open said gating devices only on the occurrence of a control pulse, and accumulator means coupled to said gating devices to count the pulses passed by said gating devices separately.

3. Apparatus for reading and evaluating information carried by a form whereon marks are present only in selected areas of at least one column of such areas allotted individual numerical values, said form further bearing a column of synchronizing marks, said apparatus comprising means for supporting said form, illuminating means for directing light on to said form, means for causing relative movement between said form and said illuminating means, a synchronizing photo-sensitive device positioned to receive light from said form by reflection and to scan said synchronizing marks by virtue of said relative movement to generate synchronizing pulses, pulse-counting means, means coupling said synchronizing photo-sensitive device to said counting means whereby said counting means count said synchronizing pulses; a photo-sensitive device for each column of areas positioned to receive light from said form by reflection and to scan said areas of said column in turn by virtue of said relative movement to generate a control pulse for each area containing a mark and a gating device opened in response to each said control pulse; pulse-generating means for generating groups of pulses of numbers equal to the said numerical values, selecting means including manually-presettable means, for selectively applying groups of pulses of different number generated by said pulse-generating means to said gating device, means coupling said counting means to said selecting means whereby as successive ones of said areas are scanned, as indicated by the count in said counting means, said selecting means apply in succession to said gating device groups of pulses corresponding in number to the numerical values allotted to said areas respectively as determined by the setting of said manually-presettable means, and accumulator means coupled to said gating device to count cumulatively the pulses in the groups of pulses passed by said gating device when opened by said control pulses.

4. Apparatus for reading and evaluating information carried by a form whereon marks are present only in selected areas of at least one column of such areas allotted individual numerical values, said form further bearing a column of synchronizing marks, said apparatus comprising means for supporting said form, illuminating means for directing light on to said form, means for causing relative movement between said form and said illuminating means, a synchronizing photo-sensitive device positioned to receive light from said form and to can said synchronizing marks by virtue of said relative movement to generate synchronizing pulses, pulse-counting means, means coupling said synchronizing photo-sensitive device to said counting means whereby said counting means counts said synchronizing pulses; a photo-cell for each column of areas positioned to receive light from said form and to scan said areas of said column in turn by virtue of said relative movement to generate a varying waveform for each area containing a mark, a gate, means coupling said synchronizing photo-sensitive device to said gate whereby said gate passes in response to said varying waveform a synchronizing pulse to generate a control pulse for each area containing a mark and a gating device opened in response to each said control pulse; pulse-generating means for generating groups of pulses of numbers equal to the said numerical values, selecting means including manually-presettable means, for selectively applying groups of pulses of different number generated by said pulse-generating means to said gating device, means coupling said counting means to said selecting means whereby as successive ones of said areas are scanned, as indicated by the count in said counting means, said selecting means apply in succession to said gating device groups of pulses corresponding in number to the numerical values allotted to said areas respectively as determined by the setting of said manually-presettable means, and accumulator means coupled to said gating device to count cumulatively the pulses in the groups of pulses passed by said gating device when opened by said control pulses.

5. Apparatus for reading and evaluating information carried by a form whereon marks are present only in selected areas of at least one column of such areas allotted individual numerical values, said form further bearing a column of synchronizing marks, said apparatus comprising means for supporting said form, illuminating means for directing light on to said form, means for causing relative movement between said form and said illuminating means, a synchronizing photo-sensitive device positioned to receive light from said form and to scan said synchronizing marks by virtue of said relative movement to generate synchronizing pulses, pulse-counting means, means coupling said synchronizing photo-sensitive device to said counting means whereby said counting means counts said synchronizing pulses; a photo-sensitive device for each column of areas positioned to receive light from said form and to scan said areas of said column in turn by virtue of said relative movement to generate a control pulse for each area containing a mark and a gating device opened in response to each said control pulse; pulse-generating means for generating groups of pulses of numbers equal to the said numerical values, selecting means, manually-presettable means connecting said pulse-counting means to said selecting means, said pulse-counting means having a plurality of output circuits energized in turn as successive synchronizing pulses are counted whereby input circuits of said selecting means are energized in an order determined by said manually-presettable means, means coupling said pulse-generating means to said gating device through said selecting means whereby as successive ones of said areas are scanned, as indicated by the count in said counting means, said selecting means apply in succession to said gating device groups of pulses generated by said pulse-generating means corresponding in number to the numerical values allotted to said areas respectively as determined by the setting of said manually-presettable means, and accumulator means coupled to said gating device to count cumulatively the pulses in the groups of pulses passed by said gating device when opened by said control pulses.

6. Apparatus for reading and evaluating information carried by a form whereon marks are present only in selected areas of at least one column of such areas allotted individual numerical values, said form further bearing a column of synchronizing marks, said apparatus comprising a conveyor belt, a plurality of form-feeding devices, means coupling said form-feeding devices whereby they function in synchronism to feed forms on to said belt at spaced intervals, illuminating means disposed at a scanning station to illuminate each form carried therethrough by said belt, a synchronizing photo-sensitive device positioned to receive light from said form and to scan said synchronizing marks in turn to generate synchronizing pulses as said form passes through said scanning station, pulse-counting means, means coupling said synchronizing photo-sensitive device to said counting means whereby said counting means counts said synchronizing pulses; a photo-sensitive device for each column of areas positioned to receive light from said form and to scan said areas of said column in turn as said form passes through said scanning station to generate a control pulse for each area containing a mark and a gating device opened in response to each said control pulse; pulse-generating means for generating groups of pulses of numbers equal to the said numerical values, selecting means including manually-presettable means, for selectively applying groups of pulses of different number generated by said pulse-generating means to said gating device, means coupling said counting means to said selecting means whereby as successive ones of said areas are scanned, as indicated by the count in said counting means, said selecting means apply in succession to said gating device groups of pulses corresponding in number to the numerical values allotted to said areas respectively as determined by the setting of said manually-presettable means, and accumulator means coupled to said gating device to count cumulatively the pulses in the groups of pulses passed by said gating device when opened by said control pulses.

References Cited in the file of this patent
UNITED STATES PATENTS

| | | |
|---|---|---|
| 2,523,516 | Potter | Sept. 26, 1950 |
| 2,624,786 | Potter | Jan. 6, 1953 |
| 2,645,343 | Nemir | July 14, 1953 |